June 5, 1945.   F. C. BUECHMANN   2,377,755
ACTUATING MECHANISM FOR GAUGES AND THE LIKE
Filed June 15, 1943   2 Sheets-Sheet 1
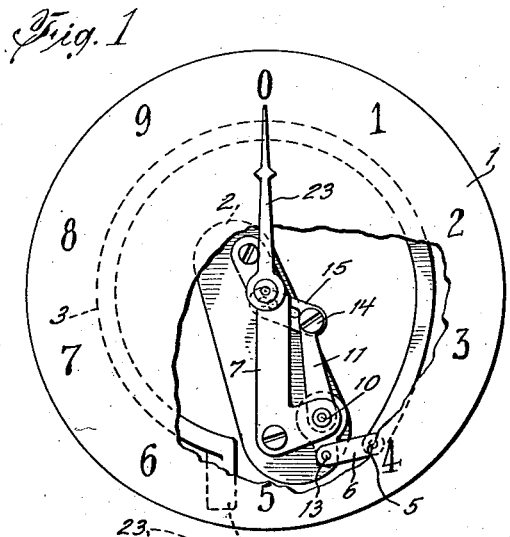
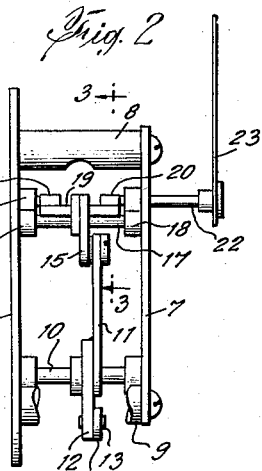
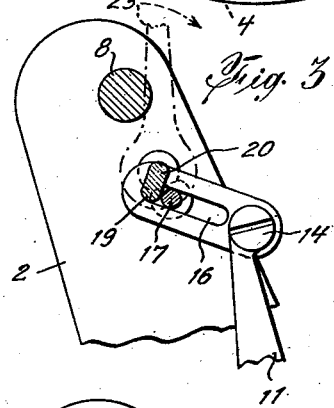
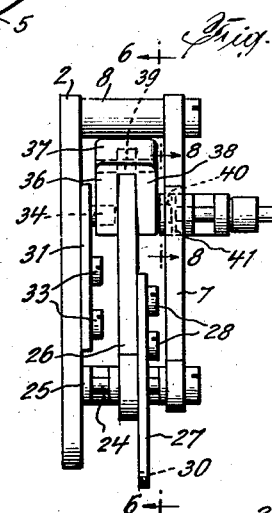
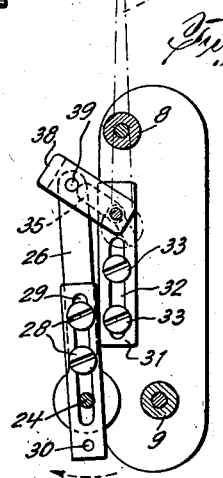
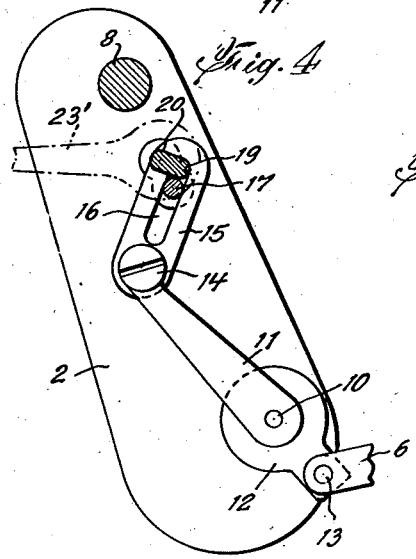
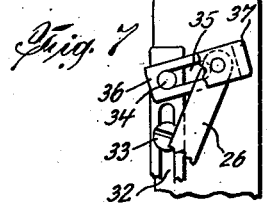
INVENTOR.
Frederick C. Buechmann
BY
ATTORNEY June 5, 1945.   F. C. BUECHMANN   2,377,755
ACTUATING MECHANISM FOR GAUGES AND THE LIKE
Filed June 15, 1943   2 Sheets-Sheet 2
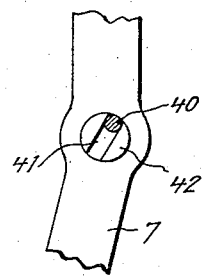
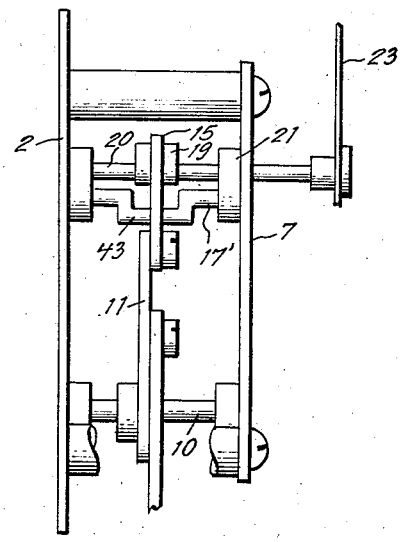
INVENTOR.
Frederick C. Buechmann
BY
ATTORNEY Patented June 5, 1945

2,377,755

UNITED STATES PATENT OFFICE 2,377,755

ACTUATING MECHANISM FOR GAUGES AND THE LIKE

Frederick C. Buechmann, St. Albans, N. Y.

Application June 15, 1943, Serial No. 490,855

17 Claims. (Cl. 73—411)

The present invention is directed to a mechanical movement whereby straight line motion may be transformed into rotatory motion. More particularly, the invention is directed to such a mechanism in association with other elements, to provide measuring instruments, as, for example, pressure gauges.

It has been common in the past, in the manufacture of pressure gauges, to provide a Bourdon tube or other means for transmitting the pressure imposed upon an instrument, and, in turn, using the movement of such a tube to cause the movement of a pointer over a dial. In the intermediate train of elements for translating the motion of the tube to rotation of the pointer, there was usually provided a rack and gear. While this functioned to give the desired indication, there were a number of disadvantages inherent therein. In order to obtain accurate readings, the gear teeth, which were necessarily quite small, had to be machined to an extreme degree of accuracy. This required highly skilled labor and considerable time, so that such gearing became quite expensive. Also, in use, wear took place and considerable lost motion was produced. This, of course, detracted from the accuracy of the instrument.

The present invention is intended and adapted to overcome the disadvantages and difficulties inherent in prior constructions, it being among the objects of the present invention to provide a mechanism particularly adapted for measuring instruments, including pressure gauges, wherein all of the elements are directly united without the use of gears.

It is also among the objects of the present invention to provide a mechanism consisting of a series of links, wherein motion of a source may be transmitted positively to a pointer, or the like.

It is still further among the objects of the present invention to provide a construction which is accurate, which may be incorporated in an instrument wherein the pointer is capable of making a complete revolution, which can be produced in quantity without the necessity for having highly skilled workmen, and which may be assembled and repaired rapidly and accurately.

In practicing the present invention I provide the usual dial and pointer and means for actuating the pointer, as, for instance, a Bourdon tube. To the movable end of said tube there is provided a link which operates a pivoted bar, the latter in turn being connected to a crank by a slotted member. A fixed pin passes through the slot and the movement of the link causes the shifting of the pin in the slot, and thereby translates the line motion of the link into rotatory motion of the pointer shaft which is secured to the crank.

In the accompanying drawings, constituting a part hereof, and in which like reference characters indicate like parts:

Fig. 1 is a front or face view of a pressure gauge embodying the present invention, the face of the dial being broken away to show some of the operating parts;

Fig. 2 is a side view of the mechanism constituting the present invention;

Fig. 3 is an enlarged fragmentary plan view of a portion of the operating mechanism showing particularly the slotted bar and associated parts, said view being taken along the line 3—3 of Fig. 2;

Fig. 4 is a view similar to Fig. 3, showing the mechanism in the opposite end of the travel of the pin in the slot;

Fig. 5 is a view similar to Fig. 2, showing a modified form of the invention;

Fig. 6 is a cross-sectional view taken along the line 6—6 of Fig. 5;

Fig. 7 is a fragmentary view similar to Fig. 6, showing the slotted member at the opposite end of its travel;

Fig. 8 is a fragmentary enlarged view of the pointer shaft and associated parts taken along the line 8—8 of Fig. 5;

Fig. 9 is a view similar to Fig. 2, showing a slightly modified form of the invention.

The device includes a dial 1 held in a suitable casing (not shown) which in turn is secured to a base 2 constituting the means for holding the mechanism in proper relative position. A Bourdon tube 3 has an inlet 4 for steam, air, or the like, the pressure of which is to be measured, and has a free end 5 capable of moving under pressure. A link 6 extends from the end 5 of said tube. A plate 7 is rigidly supported by posts 8 and 9 in parallel relation to base plate 2. A pivot 10 is held between plates 2 and 7 and a bar or lever 11 is pivoted thereon. One end 12 thereof is connected at 13 with link 6.

The other end 14 is pivotally connected to bar 15, having a longitudinal slot 16 therein. A pin 17 is held in bearings 18 on plates 2 and 7, respectively, and passes through slot 16. A crank 19 on crankshaft 20 is fixed in slot 16. The crankshaft is pivoted at 21 on plates 2 and 7. Pointer shaft 22 is a continuation of the crankshaft and has a pointer 23 secured to the end thereof.

In the operation of the device the pointer 23 is at the zero point on the dial, as shown in Fig. 1, when there is no pressure in tube 3. Upon the application of pressure, link 6 is pulled to the right, as shown in Fig. 1, so that bar 11 is moved to the left from the position shown in Fig. 3 to the other extreme position shown in Fig. 4. The slotted bar 15 moves to the left and slides on pin 17 until bars 11 and 15 are in alinement. It moves further to the left, as shown in Fig. 4, in which position pin 17 is again at the end of the slot 16. These movements cause an oscillation of crank 19 and a rotation of shafts 20 and 22.

Because of the position of pin 17, pointer 23 will move to the right of Fig. 1 and is capable of describing an arc of about 270°, assuming the position shown at 23' in Fig. 4. The motion is limited by the movement of bar 15, so that pin 17 is at the end thereof.

In Figs. 5 to 8, inclusive, is shown a modification of the structure wherein the relation of the elements is such that pointer 23 is capable of describing a full circle, or even somewhat more than a complete circle. Between plates 2 and 7 is mounted a shaft 24 on bearings 25, having pivoted thereon a bar 26. A plate 27 embraces pivot 24 and is held in a number of adjustable positions by set screws 28 operating in slot 29. The free end 30 thereof is connected with link 6. Plate 27 provides means for adjusting the length of bar 26 to fit various actuating mechanisms.

A plate 31 having a slot 32 therein is secured in a number of desired positions on base plate 2 by set screws 33. At the end thereof is a pin 34 which extends for a short distance at right angles to base 2. Said pin operates in slot 35 of leg or slotted bar 36 of a U-shaped crank having a base 37 and a leg or crank 38 parallel to leg 36. The free end of bar 26 is pivotally mounted at 39 between legs 36 and 38.

A short pin 40 extends upwardly from leg 38 and fits into groove 41 across the lower end of extension 42 of pointer shaft 22.

The modification shown in Fig. 9 is quite similar to that shown in Figs. 1-4, inclusive, in which embodiment there is a pin 17 which obstructs the movement of slotted bar 15 and prevents the making of a complete circle by pointer 23. In Fig. 9 there is no interference with the movement of bar 15, and pointer 23 may make a complete circle. This is accomplished by substituting for pin 17 an equivalent pin 17' having at its central portion an angular crank-like extension 43 which is parallel to pin 17' and operates in slot 16. By this means the movement of crank 19 is free, and a complete rotation of shaft 20 is afforded, whereas in Fig. 2 pin 17 interferes with the movement of crank 19.

In the operation of the device shown in Figs. 5 to 7, when the pointer 23 is at zero on the dial, the mechanism is in the position shown in Fig. 6, with pin 34 at one end of the slot. As pressure in tube 3 is exerted, bar 6 is moved to the left, thereby moving crank 36—38 to the left, and by the action of pin 34, leg 36 moves so that said pin contacts along the slot until it reaches the opposite end thereof, and as pressure continues to increase, leg 36 moves back again so that pin 34 is again at the first mentioned end of the slot and the mechanism is at the position shown in Fig. 7.

By this series of movements, pointer 23 is moved from the zero point on the dial through all of the extent thereof, until it again reaches the zero and may even go beyond it. Normally, it is, of course, desired that the pointer does not go beyond 360°. Upon the release of the pressure in tube 3, the pointer will rotate to the left and when the pressure has been removed, the pointer is at rest at the zero point on the dial.

From the above it will be noted that the present invention provides a simple mechanism which may be readily made in production quantities at a relatively low cost. The parts may be readily assembled to provide an instrument which is quite accurate and which is not subject to wear and resultant inaccuracies. Extremely fine machine work is not necessary, as ordinary tolerances may be used with good results. The mechanism is sturdy and it is proof against vibration.

Although I have described my invention setting forth three specific embodiments thereof, the invention is not limited thereto. Many other embodiments are possible within the fundamental concept of the invention. It will be obvious to the skilled worker that many variations in the size, shape and character of the individual elements may be made while providing a device which has all of the functions of the present invention. Therefore, it is contemplated that variations in number and character of parts may be made without departing from the spirit of the invention, the scope of which is defined in the claims appended hereto.

What I claim is:

1. In a gauge having a base, a dial mounted thereon, a pointer secured to a shaft pivoted for rotation in proximity to said dial and means for actuating said pointer, mechanism for transmitting motion from said means to said pointer comprising a pivoted bar having one end linked to said means, a bar having a slot therein, a pin extending from said base and into said slot, the other end of said pivoted bar being pivotally connected to said slotted bar, a crank on said slotted bar and connected to said shaft, whereby line motion of said means is translated into rotation of said pointer.

2. In a gauge having a base, a dial mounted thereon, a pointer secured to a shaft pivoted for rotation in proximity to said dial and means for actuating said pointer, mechanism for transmitting motion from said means to said pointer comprising a pivoted bar having one end linked to said means, a bar having a slot therein, a pin extending from said base and into said slot, the other end of said pivoted bar being pivotally connected to said slotted bar, a crank and crankshaft associated with and operatively connected to said slotted bar and connected to said shaft, said pin, pivot connection and crankshaft being parallel to each other, whereby line motion of said means is translated into rotation of said pointer.

3. In a gauge having a base, a dial mounted thereon, a pointer secured to a shaft pivoted for rotation in proximity to said dial and means for actuating said pointer, mechanism for transmitting motion from said means to said pointer comprising a pivoted bar having one end linked to said means, a bar having a slot therein, a pin extending from said base and into said slot, the other end of said pivoted bar being pivotally connected to said slotted bar, a crank and crankshaft associated with and operatively connected to said slotted bar and connected to said shaft, said pin, pivot connection and crankshaft being parallel to each other, said pin being disposed between said pivot connection and crank, whereby line motion of said means is translated into rotation of said pointer.

4. In a device for converting line motion into rotation having a base, means for causing line motion, a rotatable shaft, mechanism for transmitting motion from said means to said shaft comprising a pivoted bar having one end linked to said means, a bar having a slot therein, a pin extending from said base and into said slot, the other end of said pivoted bar being pivotally connected to said slotted bar, a crank on said slotted bar and connected to said shaft, whereby line motion of said means is translated into rotation of said shaft.

5. In a device for converting line motion into rotation having a base, means for causing line motion, a rotatable shaft, mechanism for transmitting motion from said means to said shaft comprising a pivoted bar having one end linked to said means, a bar having a slot therein, a pin extending from said base and into said slot, the other end of said pivoted bar being pivotally connected to said slotted bar, a crank and crankshaft associated with and operatively connected to said slotted bar and connected to said shaft, said pin, pivot connection and crankshaft being parallel to each other, whereby line motion of said means is translated into rotation of said shaft.

6. In a device for converting line motion into rotation having a base, means for causing line motion, a rotatable shaft, mechanism for transmitting motion from said means to said shaft comprising a pivoted bar having one end linked to said means, a bar having a slot therein, a pin extending from said base and into said slot, the other end of said pivoted bar being pivotally connected to said slotted bar, a crank and crankshaft associated with and operatively connected to said slotted bar and connected to said shaft, said pin, pivot connection and crankshaft being parallel to each other, said pin being disposed between said pivot connection and crank, whereby line motion of said means is translated into rotation of said shaft.

7. In a gauge having a base, a dial mounted thereon, a pointer secured to a shaft pivoted for rotation in proximity to said dial and means for actuating said pointer, mechanism for transmitting motion from said means to said pointer comprising a pivoted bar having one end linked to said means, a bar having a slot therein, a pin extending from said base and into said slot, the other end of said pivoted bar being pivotally connected to said slotted bar, a crank on said slotted bar and connected to said shaft, the relative position of said pin being such that said pointer is adapted to rotate about 270°, whereby line motion of said means is translated into rotation of said pointer.

8. In a gauge having a base, a dial mounted thereon, a pointer secured to a shaft pivoted for rotation in proximity to said dial and means for actuating said pointer, mechanism for transmitting motion from said means to said pointer comprising a pivoted bar having one end linked to said means, a bar having a slot therein, a pin extending from said base and into said slot, the other end of said pivoted bar being pivotally connected to said slotted bar, a crank on said slotted bar and connected to said shaft, the relative position of said pin being such that said pointer is adapted to rotate at least 360°, whereby line motion of said means is translated into rotation of said pointer.

9. In a gauge having a base, a dial mounted thereon, a pointer secured to a shaft pivoted for rotation in proximity to said dial and means for actuating said pointer, mechanism for transmitting motion from said means to said pointer comprising a pivoted bar having one end linked to said means, a bar having a slot therein, a pin extending from said base and into said slot, the other end of said pivoted bar being pivotally connected to said slotted bar, a crank on said slotted bar and connected to said shaft, said pin extending to a point in said slot, whereby line motion of said means is translated into rotation of said pointer.

10. In a gauge having a base, a dial mounted thereon, a pointer secured to a shaft pivoted for rotation in proximity to said dial and means for actuating said pointer, mechanism for transmitting motion from said means to said pointer comprising a frame having two parallel members, a pivot held between said members, a bar on said pivot, one end thereof being linked to said means, a slotted bar, the other end of said pivoted bar being pivotally connected to one end of said slotted bar, a pin passing through said slot and fixed in said members, a crankshaft mounted in said members, said pointer shaft being integral with said crankshaft, a crank on said crankshaft, the other end of said slotted bar being mounted on said crank.

11. In a gauge having a base, a dial mounted thereon, a pointer secured to a shaft pivoted for rotation in proximity to said dial and means for actuating said pointer, mechanism for transmitting motion from said means to said pointer comprising a frame having two parallel members, a pivot held between said members, a bar on said pivot, one end thereof being linked to said means, a slotted bar, the other end of said pivoted bar being pivotally connected to one end of said slotted bar, a pin passing through said slot and fixed in said members, a crankshaft mounted in said members, said pointer shaft being integral with said crankshaft, a crank on said crankshaft, the other end of said slotted bar being mounted on said crank, said pivoted and slotted bars being intermediate and parallel with said members.

12. In a gauge having a base, a dial mounted thereon, a pointer secured to a shaft pivoted for rotation in proximity to said dial and means for actuating said pointer, mechanism for transmitting motion from said means to said pointer comprising a frame having two parallel members, a pivot held between said members, a bar on said pivot, one end thereof being linked to said means, a U-shaped crank, the other end of said pivoted bar being journaled in said crank, one of the legs of said U being slotted, a pin in said frame engaged in said slot, the other leg of said U having an extension operatively connected to the pointer shaft to rotate the same.

13. In a gauge having a base, a dial mounted thereon, a pointer secured to a shaft pivoted for rotation in proximity to said dial and means for actuating said pointer, mechanism for transmitting motion from said means to said pointer comprising a frame having two parallel members, a pivot held between said members, a bar on said pivot, one end thereof being linked to said means, a U-shaped crank, the other end of said pivoted bar being journaled in said crank, one of the legs of said U being slotted, a pin in said frame engaged in said slot, the other leg of said U having an extension operatively connected to the pointer shaft to rotate the same, said journal, pin and extension being parallel to each other, said extension being off-center relative to said pointer shaft.

14. In a gauge having a base, a dial mounted thereon, a pointer secured to a shaft pivoted for rotation in proximity to said dial and means for actuating said pointer, mechanism for transmitting motion from said means to said pointer comprising a frame having two parallel members, a pivot held between said members, a bar on said pivot, one end thereof being linked to said means, a U-shaped crank, the other end of said pivoted bar being journaled in said crank and being embraced by said crank, one of the legs of said U being slotted, a pin in said frame engaged in said slot, the other leg of said U having an extension operatively connected to the pointer shaft to rotate the same.

15. In a gauge having a base, a dial mounted thereon, a pointer secured to a shaft pivoted for rotation in proximity to said dial and means for actuating said pointer, mechanism for transmitting motion from said means to said pointer comprising a frame having two parallel members, a pivot held between said members, a bar on said pivot, one end thereof being linked to said means, a U-shaped crank, the other end of said pivoted bar being journaled in said crank, one of the legs of said U being slotted, a pin in said frame engaged in said slot, the other leg of said U having an extension operatively connected to the pointer shaft to rotate the same, said pin being adjustably mounted on said frame.

16. In a gauge having a base, a dial mounted thereon, a pointer secured to a shaft pivoted for rotation in proximity to said dial and means for actuating said pointer, mechanism for transmitting motion from said means to said pointer comprising a pivoted bar having one end linked to said means, a bar having a slot therein, a pin extending from said base and into said slot, the other end of said pivoted bar being pivotally connected to said slotted bar, a crank on said slotted bar and connected to said shaft, the relative position of said pin being such that said pointer is adapted to rotate at least 360°, whereby line motion of said means is translated into rotation of said pointer.

17. In a gauge having a base, a dial mounted thereon, a pointer secured to a shaft pivoted for rotation in proximity to said dial and means for actuating said pointer, mechanism for transmitting motion from said means to said pointer comprising a pivoted bar having one end linked to said means, a bar having a slot therein, a pin extending from said base and into said slot, the other end of said pivoted bar being pivotally connected to said slotted bar, a crank associated with and operatively connected to said slotted bar and connected to said shaft, whereby line motion of said means is translated into rotation of said pointer.

FREDERICK C. BUECHMANN.